(12) United States Patent
Im et al.

(10) Patent No.: US 10,274,775 B2
(45) Date of Patent: Apr. 30, 2019

(54) LIQUID CRYSTAL DISPLAY DEVICE

(71) Applicant: SAMSUNG DISPLAY CO., LTD., Yongin-si, Gyeonggi-do (KR)

(72) Inventors: Wansoon Im, Cheonan-si (KR); Jungwook Lee, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 318 days.

(21) Appl. No.: 15/066,597

(22) Filed: Mar. 10, 2016

(65) Prior Publication Data

US 2016/0342016 A1 Nov. 24, 2016

(30) Foreign Application Priority Data

May 18, 2015 (KR) .................. 10-2015-0068934

(51) Int. Cl.
  *G02F 1/1335* (2006.01)
  *G02F 1/1345* (2006.01)
  *G02F 1/1339* (2006.01)

(52) U.S. Cl.
  CPC ...... *G02F 1/133512* (2013.01); *G02F 1/1345* (2013.01); *G02F 1/13394* (2013.01); *G02F 2001/13398* (2013.01)

(58) Field of Classification Search
  CPC ............. G02F 1/133512; G02F 1/1345; G02F 1/13394; G02F 2001/13398; G02F 1/133514; G02F 1/136209; G02F 1/13473; G02F 1/133371; G02F 2001/136222; G02F 2001/136218; G02F 1/0107; G02F 1/1339; G02F 1/13392; G02F 1/161; G02F 1/133377; G02F 2001/13396; H01J 11/44; H01J 2211/444; H01J 2329/323; H01J 29/327; H01L 27/3246
  USPC .................................. 349/106–111, 155–157
  See application file for complete search history.

(56) References Cited

U.S. PATENT DOCUMENTS

| 8,035,779 | B2 | 10/2011 | Baek et al. |
| 8,077,275 | B2 | 12/2011 | Yang et al. |
| 8,169,569 | B2 | 5/2012 | Kang et al. |
| 8,421,982 | B2 | 4/2013 | Kim et al. |

(Continued)

FOREIGN PATENT DOCUMENTS

| KR | 101013987 B1 | 2/2011 |
| KR | 20110042663 A | 4/2011 |

(Continued)

*Primary Examiner* — Shan Liu
(74) *Attorney, Agent, or Firm* — Cantor Colburn LLP

(57) ABSTRACT

A liquid crystal display device includes a first substrate, on which a display area and a non-display area are defined, a first electrode on the first substrate in the non-display area, where the first electrode receives a common voltage, a step difference pattern on the first electrode, a second electrode on the step difference pattern, where the second electrode is electrically connected to the first electrode, a first light shielding unit spaced apart from the step difference pattern and having a first height, a second light shielding unit between the first light shielding unit and the step difference pattern, where the second light shielding unit has a second height, which is less than the first height, a second substrate opposing the first substrate, and a liquid crystal layer between the first substrate and the second substrate.

17 Claims, 8 Drawing Sheets

(56) References Cited

U.S. PATENT DOCUMENTS

| | | | | |
|---|---|---|---|---|
| 2005/0140892 A1* | 6/2005 | Kim | ................... | G02F 1/133707 |
| | | | | 349/139 |
| 2006/0139553 A1* | 6/2006 | Kang | ................... | G02F 1/13394 |
| | | | | 349/149 |
| 2008/0151133 A1* | 6/2008 | Kim | ................... | G02F 1/13338 |
| | | | | 349/12 |
| 2010/0033646 A1* | 2/2010 | Baek | ................. | G02F 1/1345 |
| | | | | 349/42 |
| 2010/0079710 A1* | 4/2010 | Yang | ................... | G02F 1/13392 |
| | | | | 349/106 |
| 2011/0090445 A1* | 4/2011 | Kim | ..................... | G02F 1/1339 |
| | | | | 349/139 |
| 2014/0022478 A1* | 1/2014 | Kim | ..................... | G02F 1/1339 |
| | | | | 349/43 |
| 2015/0277200 A1* | 10/2015 | Baek | ................ | G02F 1/133512 |
| | | | | 349/43 |

FOREIGN PATENT DOCUMENTS

| KR | 20110086374 A | 7/2011 |
|---|---|---|
| KR | 101380435 B1 | 3/2014 |

* cited by examiner

LIQUID CRYSTAL DISPLAY DEVICE

This application claims priority to Korean Patent Application No. 10-2015-0068934, filed on May 18, 2015, and all the benefits accruing therefrom under 35 U.S.C. § 119, the content of which in its entirety is herein incorporated by reference.

BACKGROUND

1. Field

Embodiments of the invention relate to a liquid crystal display ("LCD") device.

2. Description of the Related Art

A liquid crystal display ("LCD") device is one of the most widely used types of flat panel display ("FPD") device in recent. An LCD device typically includes two substrates including electrodes provided thereon and a liquid crystal layer interposed between the two substrates. Upon applying voltage to the electrodes, liquid crystal molecules in the liquid crystal layer are rearranged to adjust the amount of light transmitted therethrough.

In a process of manufacturing such an LCD device, a process of adhering the two substrates, respectively including the electrodes therein, to each other may have a substantial effect on image quality, and a color-filter on array ("COA") structure has been suggested to improve defects caused by errors in such an adhering process.

In general, an LCD device having such a COA structure includes a first substrate, on which a gate line, a data line, a thin film transistor, a pixel electrode and a color filter are disposed, and a second substrate, which opposes the first substrate and on which a common electrode is disposed.

The first substrate receives electric signals supplied thereto from an external device, and drives the gate line, the data line, the thin film transistor, the pixel electrode and the color filter based on the electric signals, and the common electrode on the second substrate is electrically connected to the first substrate.

In such an LCD device, a pad for receiving a common voltage applied to the common electrode and a short pad for applying the received common voltage to the second substrate may be disposed on the first substrate. By electrically connecting a plurality of electrodes on the short pad to protrude therefrom and the common electrode of the second substrate, the common voltage is applied to the common electrode of the second substrate.

SUMMARY

In a liquid crystal display ("LCD") device, a light shielding unit is typically provided to prevent reflection of externally incident light from a surface of the metal electrode formed on the first substrate. In such an LCD device, the light shielding unit is spaced apart from the plurality of electrodes, which are on the short pad to protrude therefrom, to prevent an increase in step difference and contact defects, such that metal electrodes disposed in the peripheral portion of the light shielding unit may be exposed. Accordingly, surface reflection occurs when light is externally incident.

Embodiments of the invention are directed to an LCD device with improved surface reflection of external light by disposing a plurality of electrodes, which are provided to apply a common voltage, to contact a light shielding unit.

According to an exemplary embodiment of the invention, a liquid crystal display device includes: a first substrate on which a display area and a non-display area surrounding the display area are defined; a first electrode on the first substrate in the non-display area, where the first electrode receives a common voltage; a step difference pattern on the first electrode; a second electrode on the step difference pattern, where the second electrode is electrically connected to the first electrode; a first light shielding unit spaced apart from the step difference pattern and having a first height; a second light shielding unit between the first light shielding unit and the step difference pattern, where the second light shielding unit has a second height which is less than the first height; a second substrate opposing the first substrate; and a liquid crystal layer between the first substrate and the second substrate.

In an exemplary embodiment, the first electrode may be a common electrode.

In an exemplary embodiment, the liquid crystal display device may further include a common electrode on the second substrate.

In an exemplary embodiment, the liquid crystal display device may further include a conductive spacer on the second electrode, where the conductive spacer is electrically connected to the second electrode and the common electrode.

In an exemplary embodiment, the conductive spacer may be spaced apart from the second light shielding unit.

In an exemplary embodiment, the conductive spacer may include at least one selected from gold (Au), silver (Ag), indium (In), aluminum (Al), chromium (Cr), and nickel (Ni).

In an exemplary embodiment, the liquid crystal display device may further include: a thin film transistor on the first substrate, where the thin film transistor may include a semiconductor layer, a gate electrode, a source electrode, and a drain electrode; a pixel electrode electrically connected to the thin film transistor; and red, green and blue color filters on the first substrate.

In an exemplary embodiment, the first electrode may include a material the same as a material of the gate electrode.

In an exemplary embodiment, the first electrode and the gate electrode may be defined by a same patterned layer.

In an exemplary embodiment, the first electrode may surround the display area.

In an exemplary embodiment, the step difference pattern may include a material the same as a material of at least one of the red, green, and blue color filters.

In an exemplary embodiment, the step difference pattern may include a material the same as a material of the blue color filter.

In an exemplary embodiment, the second electrode may include a material the same as a material of the pixel electrode.

In an exemplary embodiment, the second electrode and the pixel electrode may be defined by a same patterned layer.

In an exemplary embodiment, the liquid crystal display device may further include a column spacer which maintains an interval between the first substrate and the second substrate.

In an exemplary embodiment, the first light shielding unit, the second light shielding unit and the column spacer may include a same material, which shields light, as each other.

In an exemplary embodiment, the first light shielding unit, the second light shielding unit and the column spacer may be defined by a same patterned layer.

In an exemplary embodiment, the conductive spacer may include a material the same as a material of the column spacer.

In an exemplary embodiment, the conductive spacer and the column spacer may be defined by a same patterned layer.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the disclosure of invention will be more clearly understood from the following detailed description taken in conjunction with the accompanying drawings, in which.

DETAILED DESCRIPTION

Figure 1:
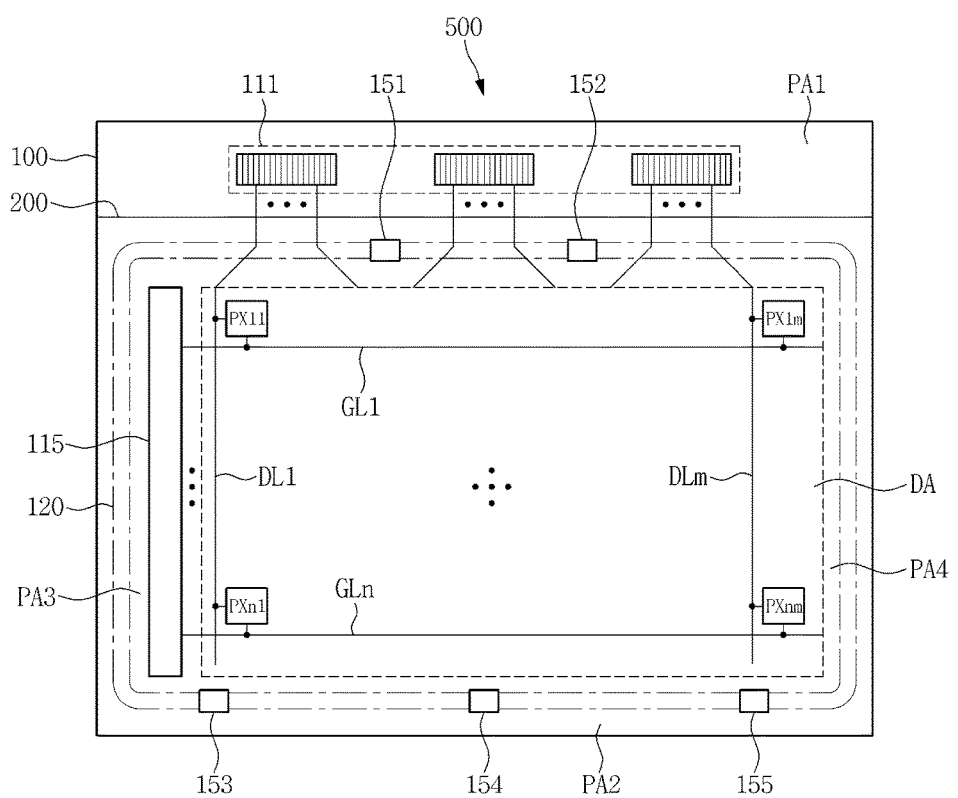
FIG. 1 is a plan view illustrating a liquid crystal display ("LCD") device according to an exemplary embodiment.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

In the drawings, the thickness of layers and regions may be exaggerated for clarity. Throughout the specification, like reference numerals refer to like elements throughout the specification. When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is a plan view illustrating a liquid crystal display ("LCD") device 500 according to an exemplary embodiment.

An exemplary embodiment of the LCD device 500 includes a first substrate 100 (or a first panel), a second substrate 200 (or a second panel) and a liquid crystal layer (not illustrated) disposed between the first and second substrates 100 and 200.

The first substrate 100 includes a display area DA and a plurality of non-display areas PA1, PA2, PA3 and PA4 surrounding the display area DA.

The display area DA includes a plurality of gate lines GL1-GLn, a plurality of data lines DL1-DLm intersecting the plurality of gate lines GL1-GLn, a plurality of pixels PX11-PXnm electrically connected to the plurality of gate lines GL1-GLn and the plurality of data lines DL1-DLm.

The gate lines GL1-GLn are connected to a gate driver 115. The gate lines GL1-GLn sequentially receive gate signals that are sequentially generated from the gate driver 115.

The data lines DL1-DLm are connected to a data driver 111. The data lines DL1-DLm receive data voltages having an analog form and applied thereto from the data driver 111. The data driver 111 may be disposed, e.g., mounted, on the first substrate 100 in a chip-on-glass ("COG") manner. In an alternative exemplary embodiment, the data driver 111 may have a tape carrier package ("TCP") structure or a chip-on-film ("COF") structure.

The pixels PX11-PXnm are positioned in an area in which the gate lines GL1-GLn and the data lines DL1-DLm intersect one another. The pixels PX11-PXnm may be arranged in a matrix-like form having "m" number of columns and "n" number of rows. Herein, "m" and "n" each are an integer greater than zero (0).

Each of the pixels PX11-PXnm is connected to a corresponding gate line of the gate lines GL1-GLn and a corresponding data line of the data lines DL1-DLm, respectively. Each of the pixels PX11-PXnm receives a data voltage applied thereto from the corresponding data line, in response to a gate signal applied thereto from the corresponding gate line. Each of the pixels PX11-PXnm displays a gray scale corresponding to the data voltage.

The first non-display area PA1 is a portion adjacent to an end portion of the data line DL in an area surrounding the display area DA, and the data driver 111 including a plurality of data pads may be disposed in the first non-display area PA1.

The second non-display area PA2 is a portion opposing the first non-display area PA1 in the area surrounding the display area DA.

The third non-display area PA3 is a portion adjacent to an end portion of the gate line GL in the area surrounding the display area DA, and the gate driver 115 electrically connected to the gate line GL to generate the gate signal may be disposed in the third non-display area PA3.

The fourth non-display area PA4 is a portion opposing the third non-display area PA3 in the area surrounding the display area DA.

In an exemplary embodiment, a plurality of short pad units 151, 152, 153, 154 and 155 is disposed in the first, second, third and fourth non-display areas PA1, PA2, PA3 and PA4. The short pad units 151, 152, 153, 154, and 155 may be disposed on areas overlapping the second substrate 200 in the first, second, third and fourth non-display areas PA1, PA2, PA3, and PA4. The short pad units 151, 152, 153, 154 and 155 are electrically connected to the second substrate 200. In one exemplary embodiment, for example, the short pad units 151, 152, 153, 154 and 155 may be disposed in the first non-display area PA1 and the second non-display area PA2, as shown in FIG. 1.

The second substrate 200 is disposed to oppose the first substrate 100, and the second substrate 200 and the first substrate 100 are coupled to each other, e.g., adhered to each other by a sealant (not illustrated) to seal the liquid crystal layer (not illustrated).

Figure 2:
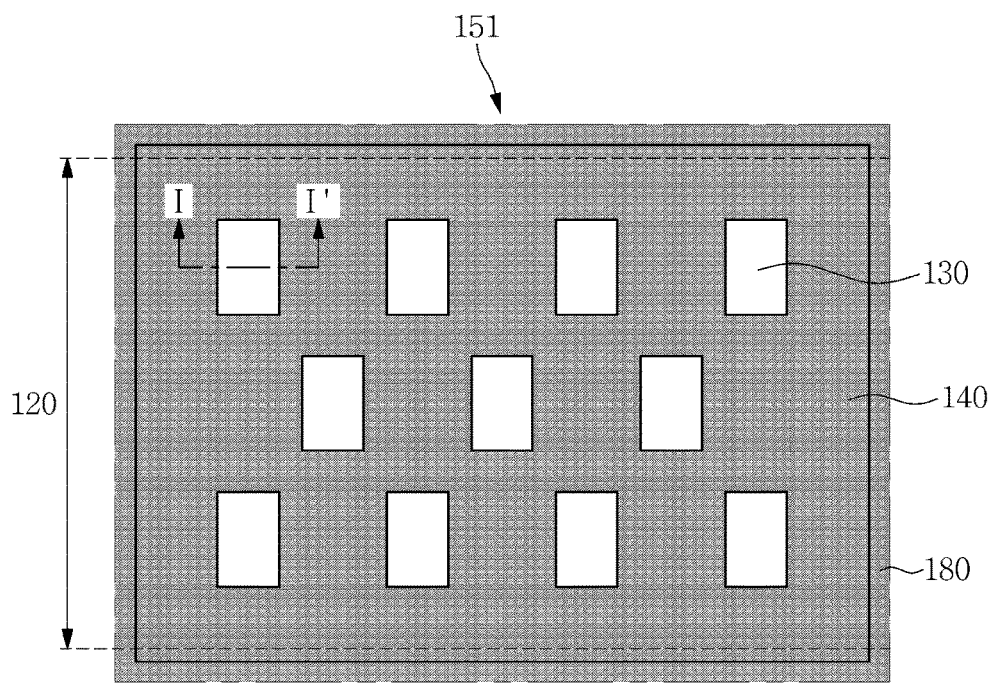
FIG. 2 is an enlarged plan view illustrating a short pad unit illustrated in FIG. 1.
Figure 3:
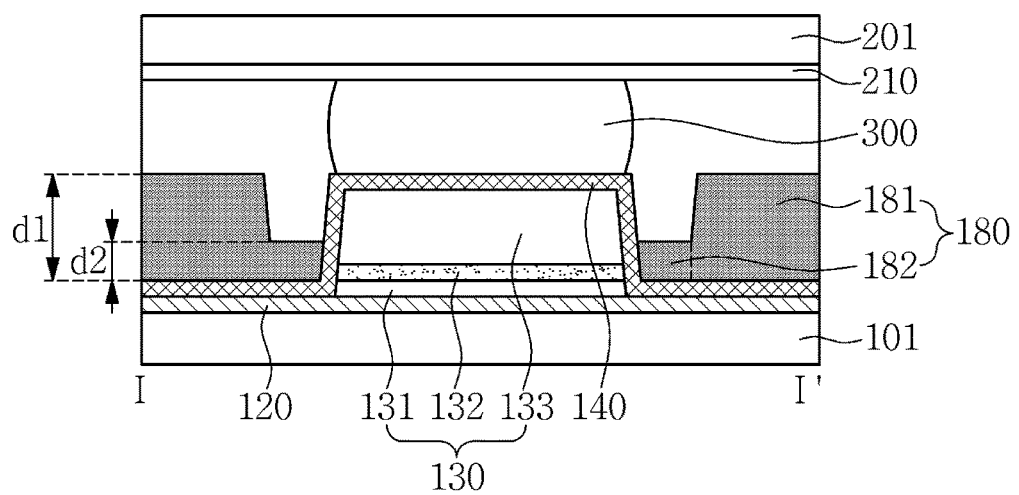
FIG. 3 is a cross-sectional view taken along line I-I' of FIG. 2.

FIG. 2 is an enlarged plan view illustrating the short pad unit 151 illustrated in FIG. 1, and FIG. 3 is a cross-sectional view taken along line I-I' of FIG. 2.

In an exemplary embodiment, as illustrated in FIGS. 2 and 3, the short pad unit 151 includes a first electrode 120, a step difference pattern 130, a second electrode 140, and a light shielding unit 180, on a first base substrate 101 of the first substrate 100.

In such an embodiment, the first electrode 120 includes a metal layer. The first electrode 120 may include a metal layer the same as that defining the gate line GL, or may include a metal layer the same as that defining the data line DL. According to an exemplary embodiment shown in FIG. 3, the first electrode 120 includes a metal layer the same as that defining the gate line GL, for example, but not being limited thereto.

In one alternative exemplary embodiment, for example, the first electrode 120 may be defined by a portion of a common electrode. In such an embodiment, the LCD device may be a plane to line switching ("PLS")-mode LCD device in which the pixel electrode and the common electrode are in a same substrate, e.g., the first substrate 100.

The step difference patterns 130 are disposed on the first electrode 120 in plural, while being spaced apart from each other in an island shape. In one exemplary embodiment, for example, a width of the spaced portion defined by the step difference pattern 130 may be about 20 micrometers (μm). In such an embodiment, the step difference pattern 130 may include a material the same as that of the color filter 104.

The step difference pattern 130 may include a plurality of layers. In one exemplary embodiment, for example, the step difference pattern 130 may include a first step difference layer 131, a second step difference layer 132 on the first step difference layer 131, and a third step difference layer 133 on the second step difference layer 132, as shown in FIG. 3.

The second electrode 140 includes a conductive material and is disposed on the step difference pattern 130. The second electrode 140 may include or be formed of a transparent conductive material the same as that of the pixel electrode PE.

The light shielding unit 180 includes a first light shielding unit 181 spaced apart from the step difference pattern 130 and having a first height d1, and a second light shielding unit 182 disposed between the first light shielding unit 181 and the step difference pattern 130 and having a second height d2 which is less than the first height d1.

The second substrate 200 includes a second base substrate 201 and a common electrode 210. The second base substrate 201 may be a transparent insulating substrate. The common electrode 210 is disposed on the second base substrate 201. The common electrode 210 may include or be formed of a transparent conductive material such as indium tin oxide ("ITO") or indium zinc oxide ("IZO"), for example. In such an embodiment, ITO may be a polycrystalline or monocrystalline material, and IZO may be a polycrystalline or monocrystalline material, as well.

In an exemplary embodiment, a conductive spacer 300 is disposed on the second electrode 140, and electrically connects the second electrode 140 on the first base substrate 101 and the common electrode 210 on the second base substrate 201. The second electrode 140 may maintain a uniform interval with respect to the common electrode 210 of the second substrate 200 due to the step difference pattern 130. Accordingly, short defects between the conductive spacer 300 and the second electrode 140 and between the conductive spacer 300 and the common electrode 210 may be effectively prevented.

Figure 4:
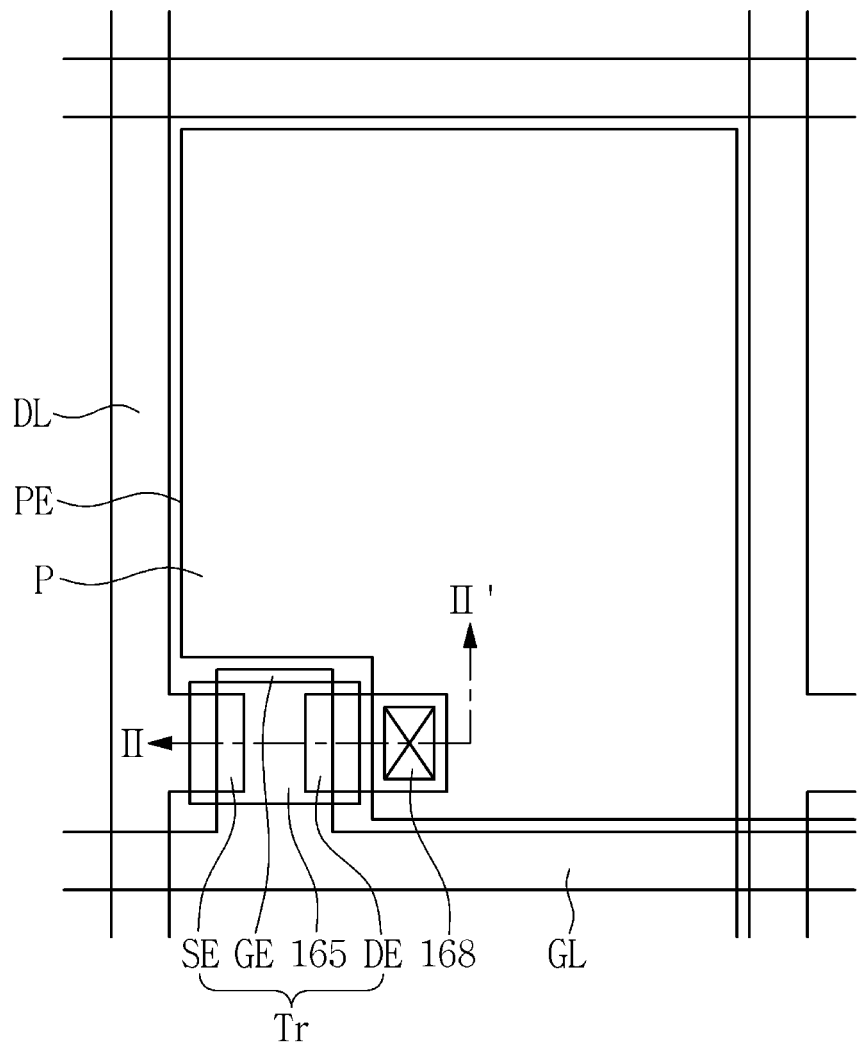
FIG. 4 is an enlarged plan view illustrating an exemplary embodiment of a pixel of the LCD device illustrated in FIG. 1.

FIG. 4 is an enlarged plan view illustrating an exemplary embodiment of a pixel of the LCD device 500 illustrated in FIG. 1.

In an exemplary embodiment, a thin film transistor Tr including a semiconductor layer 165, a gate electrode GE, a source electrode SE and a drain electrode DE is disposed on a portion at which a gate line GL and a data line DL intersect each other. In such an embodiment, a pixel electrode PE connected to the drain electrode DE of the thin film transistor Tr through a drain contact hole 168 is disposed in each pixel region P.

FIGS. 5A to 5F and 6 are cross-sectional views illustrating processes of an exemplary embodiment of a method of manufacturing a display panel of the LCD device shown in FIGS. 1 to 4. The cross-sectional views in FIGS. 5A and 6F correspond to cross-sectional views taken along line I-I' of FIG. 2 and II-IP of FIG. 4.

Figure 5A:
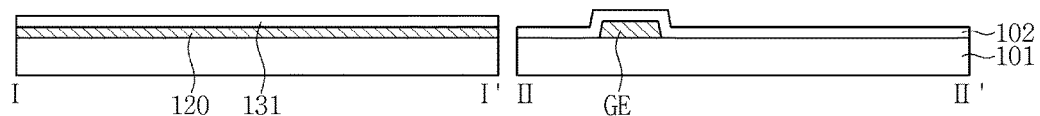
FIGS. 5A to 5F and 6 are cross-sectional views illustrating processes of an exemplary embodiment of a method of manufacturing a display panel of the LCD device shown in FIGS. 1 to 4.

In an exemplary embodiment, as illustrated in FIG. 5A, a first metal layer is provided on the first base substrate 101 and the first metal layer is patterned, to thereby form the first electrode 120 and the gate electrode GE on the first base substrate 101. The first metal layer may include or be formed of aluminum (Al) or alloys thereof, silver (Ag) or alloys thereof, copper (Cu) or alloys thereof, and/or molybdenum (Mo) or alloys thereof. In an alternative exemplary embodiment, the first metal layer may include one of chromium (Cr), tantalum (Ta), and titanium (Ti).

The first metal pattern defines the gate line GL, the gate electrode GE of the thin film transistor Tr, and the first electrode 120 in the non-display area. A length of a side of the first electrode 120, when viewed from a plan view, may be about several millimeters. Although not illustrated, the first electrode 120 is electrically connected to a voltage wiring that transmits a common voltage, and the common voltage is applied to the first electrode 120.

A gate insulating layer 102 and the first step difference layer 131 are provided together on the first base substrate 101, on which the first metal pattern is formed, to cover the first metal pattern. The gate insulating layer 102 and the first step difference layer 131 may include an inorganic insulating material such as silicon nitride (SiN$_x$) and silicon oxide (SiO$_2$), for example.

Figure 5B:
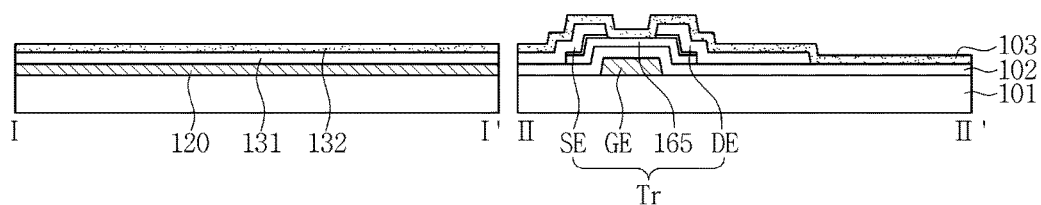

In such an embodiment, as illustrated in FIG. 5B, a semiconductor layer 165 and a second metal layer are sequentially provided on the first base substrate 101 on which the gate insulating layer 102 is provided. The semiconductor layer 165 and the second metal layer are simultaneously patterned, and thereby a second metal pattern is formed. Accordingly, the second metal pattern may have a structure in which the semiconductor layer 165 and the second metal layer are stacked one on another. In an exemplary embodiment, the semiconductor layer 165 and the second metal layer may be patterned using different masks, respectively.

According to an exemplary embodiment, the second metal pattern defines a data line DL, a source electrode SE, and a drain electrode DE.

A protection layer 103 and the second step difference layer 132 are provided together on the first base substrate 101, on which the second metal layer is formed, to cover the second metal pattern. The protection layer 103 and the second step difference layer 132 may include an inorganic insulating material such as silicon nitride (SiNx) and silicon oxide (SiO$_2$), for example, or an organic insulating material such as an acryl resin and benzocyclobutene ("BCB"), for example.

Figure 5C:
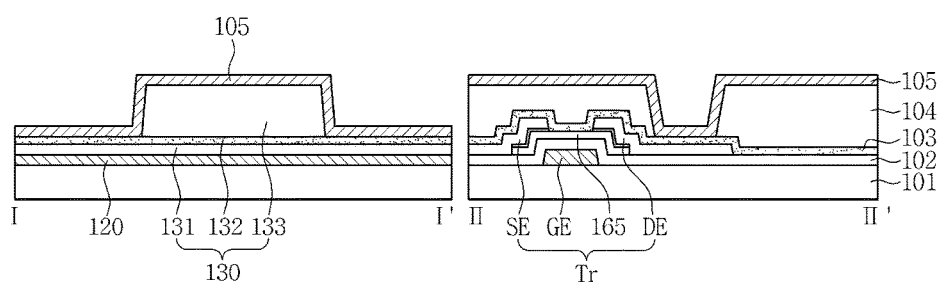

In such an embodiment, as illustrated in FIG. 5C, a color photoresist material is provided, e.g., coated, on the first base substrate 101 and patterned, and thereby a color pattern is formed. The color pattern defines the color filter 104 in the pixel region and the third step different unit 133 on the second step difference layer 132. Although an exemplary embodiment where the color filter 104 and the third step difference layer 133 are formed of the same material have the same thickness, is shown in FIG. 5C, but not being limited thereto. In an alternative exemplary embodiment, the thicknesses of the color filter 104 and the third step difference layer 133 may be different from each other.

In an exemplary embodiment, the third step difference layer 133 may be patterned simultaneously with a blue color filter among red, green and blue color filters. The blue color filter is generally patterned to have a larger thickness than the thickness of the red and green color filters, and thus the third step difference layer 133 that is patterned simultaneously with the blue color filter may allow the second electrode 140 and the common electrode 210 of the second substrate 200 to maintain a uniform interval. Accordingly, in such an embodiment, short defects caused between the conductive spacer 300 and the second electrode 140 and between the conductive spacer 300 and the common electrode 210 may be effectively prevented. In such an embodiment, the blue color filter has a light transmittance lower than that of the red and green color filters, such that the third step difference layer 133 may be provided using the same material as that forming the blue color filter to prevent light leakage in the non-display area, and may be patterned simultaneously therewith.

A planarization layer 105 is provided on the first base substrate 101 on which the color pattern is formed. The planarization layer 105 may include an inorganic insulating material such as silicon nitride (SiNx) and silicon oxide (SiO$_2$), for example, or an organic insulating material such as an acryl resin and BCB, for example. In an exemplary embodiment, as illustrated in FIG. 5C, the planarization layer 105 is provided on the second step difference layer 132 and the third step difference layer 133, but not being limited thereto. In an alternative exemplary embodiment, the planarization layer 105 may be omitted.

Figure 5D:
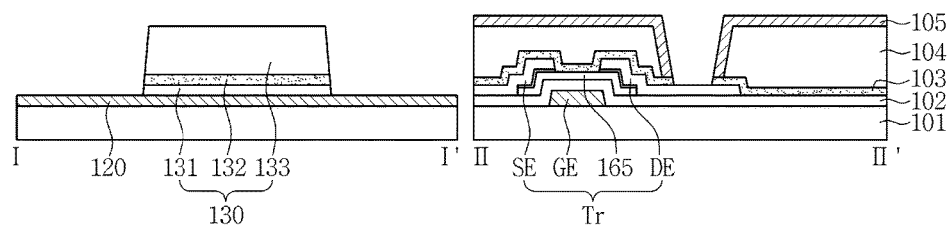
Figure 5E:
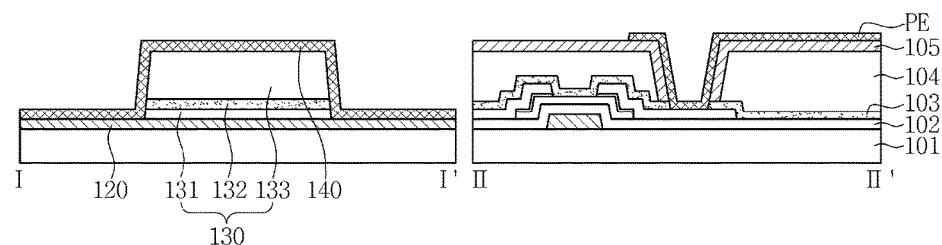

In such an embodiment, as illustrated in FIGS. 5D and 5E, the planarization layer 105 and the protection layer 103 are etched to expose the drain electrode DE. In such an embodiment, the planarization layer 105, the first step difference layer 131 and the second step difference layer 132 are etched simultaneously, to thereby expose the first electrode 120.

A transparent conductive layer is provided on the first base substrate 101 on which the drain electrode DE and the first electrode 120 are exposed and then patterned, and thereby a transparent conductive pattern is formed. The transparent conductive pattern defines the pixel electrode PE and the second electrode 140.

Figure 5F:
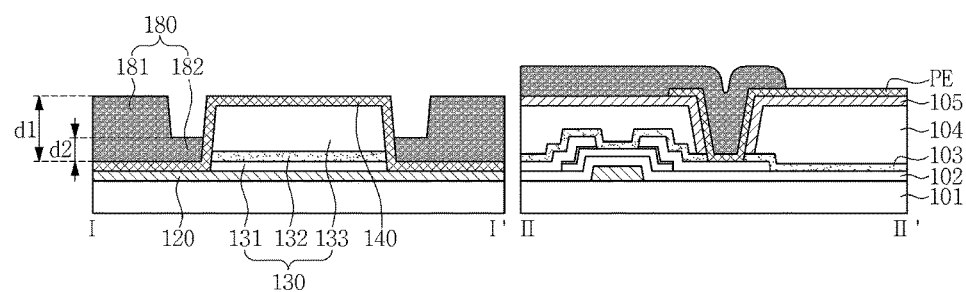

In such an embodiment, as illustrated in FIG. 5F, a photosensitive resin is provided, e.g., coated, on the first base substrate 101 and patterned, to thereby form the first light shielding unit 181 that is spaced apart from the step difference pattern 130 and has the first height d1, and the second light shielding unit 182 that is disposed between the first light shielding unit 181 and the step difference pattern 130 and has the second height d2 which is less than the first height d1.

Figure 6:
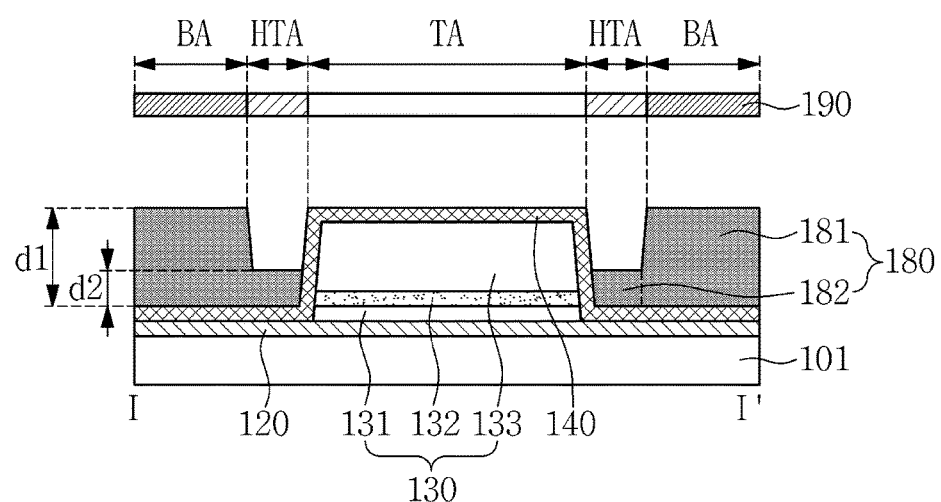

In an exemplary embodiment, as illustrated in FIG. 6, the first light shielding unit 181 and the second light shielding unit 182 are formed on the first substrate 100, using a partial light exposure mask 190.

In such an embodiment, a photosensitive resin (not illustrated) including a black pigment is coated on an entire surface of the first substrate 100. In such an embodiment, to coat the photosensitive resin on the first substrate, a method of spin coating, slit-and-spin coating, or spinless coating may be employed, but the invention is not limited thereto. In such an embodiment, the photosensitive resin may be, for example, a negative-type photosensitive resin.

Subsequently, the partial light exposure mask 190 is disposed on the first substrate 100 on which the photosensitive resin (not illustrated) is coated. In such an embodiment, as illustrated in FIG. 6, the partial light exposure mask 190 includes a transmission area TA through which light is transmitted, a blocking area BA through which light may not be transmitted, and a half-transmission area HTA through which light is partially transmitted. The half-transmission area HTA may include a plurality of slits or a half-transparent layer.

Next, light such as ultraviolet ("UV") light is selectively irradiated onto the photosensitive resin through the partial light exposure mask 190, such that the photosensitive resin is exposed to light. As illustrated in FIG. 6, the first light shielding unit 181 and the second light shielding unit 182 are formed to have different heights from each other. Herein, the height d1 of the first light shielding unit 181 that corresponds to the blocking area BA of the partial light exposure mask 190 is higher than the height d2 of the second light shielding unit 182 that corresponds to the half-transmission area HTA of the partial light exposure mask 190. In such an embodiment, a portion of the photosensitive resin corresponding to the transmission area TA of the partial light exposure mask 190 is removed.

Herein, alternative exemplary embodiments of a display panel of the LCD device will be described with reference to FIGS. 7 and 8. The same or like elements shown in FIGS. 7 and 8 have been labeled with the same reference characters as used above to describe the exemplary embodiments of the display panel, and any repetitive detailed description thereof will hereinafter be omitted or simplified.

Figure 7:
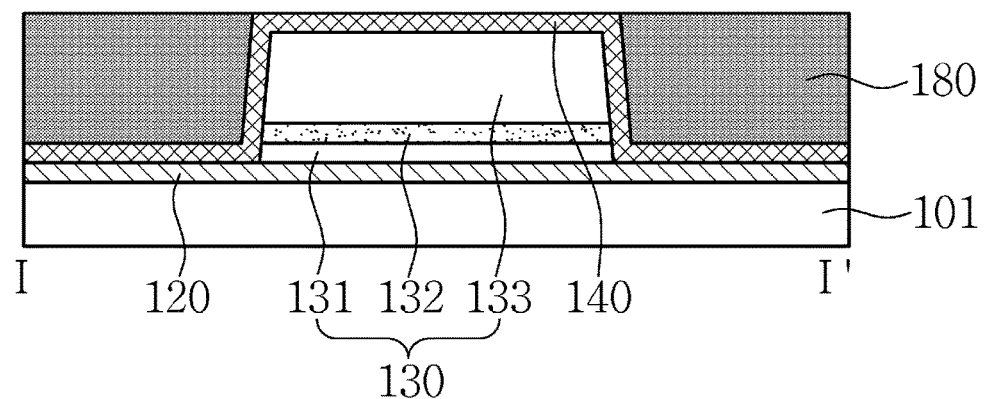
FIG. 7 is a cross-sectional view illustrating a display panel according to an alternative exemplary embodiment.

FIG. 7 is a cross-sectional view illustrating a display panel according to an alternative exemplary embodiment.

In an exemplary embodiment, as illustrated in FIG. 7, a first electrode 120 including a metal layer is disposed on a first base substrate 101, and a first step difference layer 131 and a second step difference layer 132 are sequentially disposed on the first electrode 120.

A color photoresist material is coated on the first base substrate 101 and patterned, and thereby a third step difference layer 133 is formed. A step difference pattern 130 including the first, second and third step difference layers 131, 132 and 133 may have a thickness to have the same step difference as that of the color filter 104.

In an exemplary embodiment of a manufacturing method of the display panel shown in FIG. 7, a planarization layer 105, the first step difference layer 131, and the second step difference layer 132 that are provided on the first electrode 120 are etched to expose the first electrode 120, and a second electrode 140 is disposed on the first base substrate 101.

In such an embodiment, a photosensitive resin is coated on the first base substrate 101, and a light shielding unit 180 contacting a side surface of the step difference pattern 130 and having a uniform height is formed, using a mask (not illustrated).

In such an embodiment of the LCD device 500, reflection of externally incident light from a surface of the metal electrode may be effectively prevented in the non-display area without using a partial light exposure mask 190 in the pattern process of the light shielding unit 180.

Figure 8:
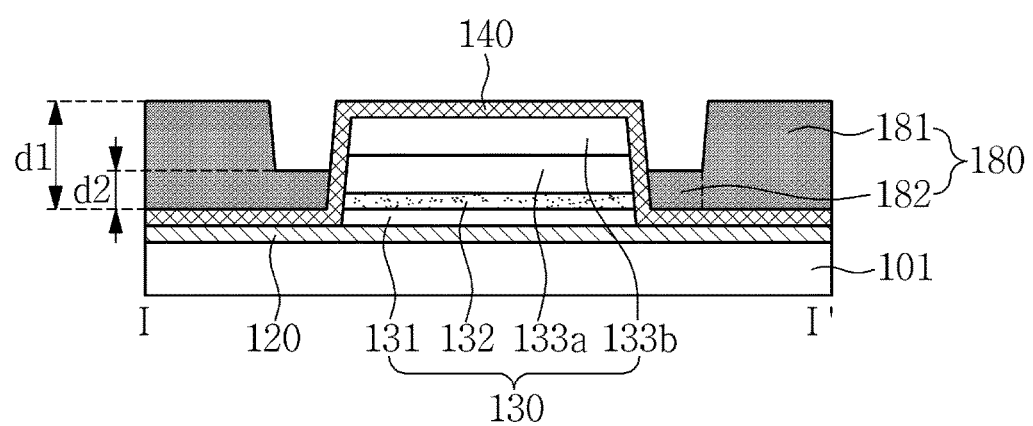
FIG. 8 is a cross-sectional view illustrating a display panel according to another alternative exemplary embodiment.

FIG. 8 is a cross-sectional view illustrating a display panel according to another alternative exemplary embodiment.

As illustrated in FIG. 8, a first electrode 120 including a metal layer is disposed on a first base substrate 101, and a first step difference layer 131 and a second step difference layer 132 are sequentially disposed on the first electrode 120.

A color photoresist material is coated on the first base substrate 101 and patterned, and thereby a first color pattern 133a is formed. Subsequently, a second color photoresist material is coated on the first base substrate 101, on which the first color pattern 133a is formed, and patterned, and thereby a second color pattern 133b is formed. As a result, a third step difference layer 133 having a double layer structure including the first color pattern 133a and the second color pattern 133b is provided on the first electrode 120.

In such an embodiment of a manufacturing method, a planarization layer 105, the first step difference layer 131 and the second step difference layer 132 that are provided on the first electrode 120 are etched to expose the first electrode 120, and the second electrode 140 is provided on the first base substrate 101 on the second color pattern 133b and the exposed portion of the first electrode 120.

A photosensitive resin is coated on the second electrode 140 on the first base substrate 101, and a first light shielding unit 181 spaced apart from the step difference pattern 130 and having a first height (or a first thickness) d1 and a second light shielding unit 182 between the first light shielding unit 181 and the step difference pattern 130 and having a second height (or a second thickness) d2, which is less than the first height d1, are formed based on the coated photosensitive resin, using a partial light exposure mask 190.

In such an embodiment, the LCD device 500 includes a third step difference layer 133 that is formed by stacking color patterns 133a and 133b having two colors among red, green, and blue colors. Accordingly, light shielding characteristics of the non-display area may be improved.

Figure 9A:
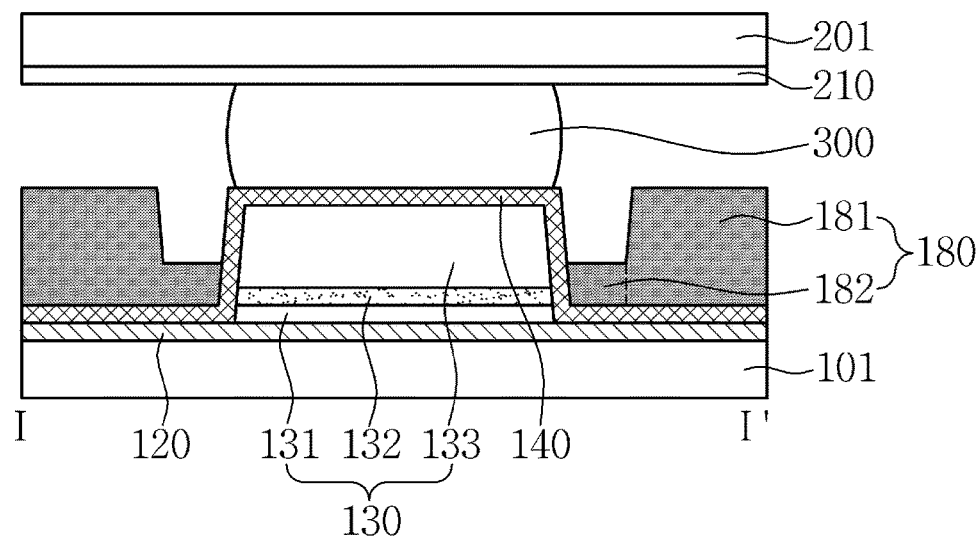
FIGS. 9A and 9B are cross-sectional views illustrating an LCD device according to an exemplary embodiment.
Figure 9B:
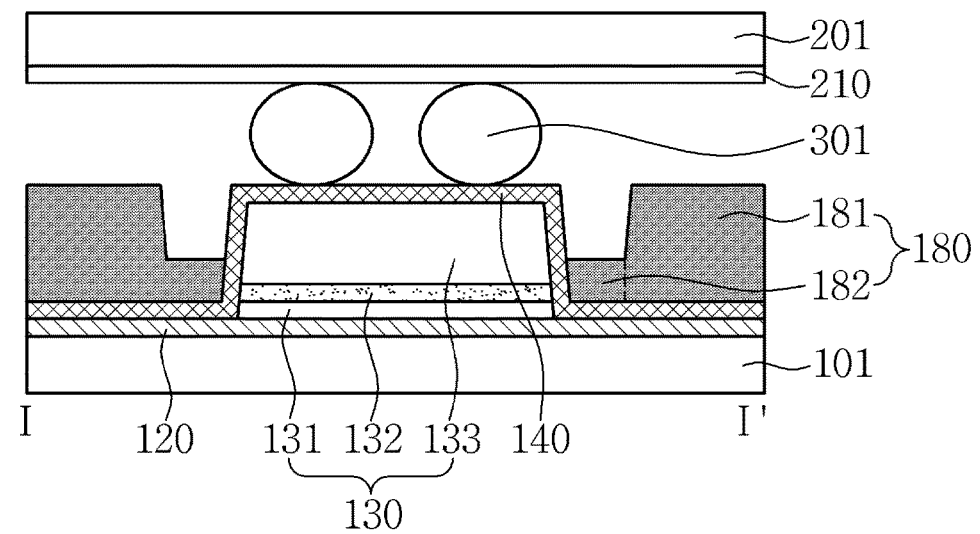

FIGS. 9A and 9B are cross-sectional views illustrating the LCD device 500 according to an exemplary embodiment.

In an exemplary embodiment, as illustrated in FIG. 9A, a conductive spacer 300 is disposed on the second electrode 140 of the first substrate 100. The conductive spacer 300 electrically connects the second electrode 140 of the first substrate 100 to the common electrode 210 of the second substrate 200.

The conductive spacer 300 may include at least one selected from gold (Au), silver (Ag), indium (In), aluminum (Al), chromium (Cr), and nickel (Ni).

In an alternative exemplary embodiment, as illustrated in FIG. 9B, a conductive ball 301 may be disposed on the second electrode 140 of the first substrate 100. In such an embodiment, the conductive ball 301 electrically connects the second electrode 140 of the first substrate 100 and the common electrode 210 of the second substrate 200.

The conductive ball 301 may have a core/shell structure with a core including an elastic material such as plastic or silica and a shell including a highly conductive metal, such as gold (Au), silver (Ag), indium (In), aluminum (Al), chromium (Cr), and nickel (Ni), or a metal alloy.

Due to the step difference pattern 130, the second electrode 140 of the first substrate 100 may maintain a uniform interval with respect to the common electrode 210 of the second substrate 200. Accordingly, short defects caused between the conductive spacer and the conductive balls 300 and 301, and the second electrode 140 and between the conductive spacer and the conductive balls 300 and 301, and the common electrode 210 may be effectively prevented.

In an exemplary embodiment, the LCD device 500 may further include a column spacer (not illustrated) disposed on one of the first substrate 100 and the second substrate 200 to maintain an interval between the first substrate 100 and the second substrate 200.

In such an embodiment, the column spacer may be disposed on the first substrate 100 and may include a material for shielding light that is the same as that forming the first light shielding unit 181 and the second light shielding unit 182. A photosensitive resin is coated on the first base substrate 101, and the first light shielding unit 181, the second light shielding unit 182 and the column spacer are simultaneously patterned through a single mask process such that the first light shielding unit 181, the second light shielding unit 182 and the column spacer may be defined by a same patterned layer.

In such an embodiment, the column spacer may be disposed on the first substrate 100, and may include a material the same as that of the conductive spacer 300, and the column spacer and the conductive spacer 300 may be simultaneously patterned such that the column spacer and the conductive spacer 300 may be defined by a same patterned layer.

As set forth above, according to exemplary embodiments, a light shielding unit that includes portions having different heights is formed in a non-display area through a single mask process, such that exposure of a metal electrode may be effectively prevented without an additional manufacturing process. Accordingly, surface reflection of external light in the non-display area may be improved.

From the foregoing, it will be appreciated that various embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A liquid crystal display device comprising:
    a first substrate on which a display area and a non-display area surrounding the display area are defined;
    a first electrode on the first substrate in the non-display area, wherein the first electrode receives a common voltage;
    a step difference pattern on the first electrode;
    a second electrode on the step difference pattern, wherein the second electrode is electrically connected to the first electrode;
    a first light shielding unit spaced apart from the step difference pattern and having a first height;
    a second light shielding unit between the first light shielding unit and the step difference pattern, wherein the second light shielding unit does not overlap the step difference pattern in a direction perpendicular to the first substrate, and wherein the second light shielding unit has a second height, which is less than the first height to form a trench by a side surface of the first light shielding unit, a flat top surface of the second light shielding unit and a side surface of the second electrode;
    a second substrate opposing the first substrate;
    a liquid crystal layer between the first substrate and the second substrate;
    a common electrode on the second substrate; and
    a conductive spacer on the second electrode, wherein the conductive spacer directly contacts the second electrode and the common electrode.

2. The liquid crystal display device of claim 1, wherein the first electrode is a second common electrode.

3. The liquid crystal display device of claim 1, wherein the conductive spacer is spaced apart from the second light shielding unit.

4. The liquid crystal display device of claim 3, wherein the conductive spacer comprises at least one selected from gold (Au), silver (Ag), indium (In), aluminum (Al), chromium (Cr) and nickel (Ni).

5. The liquid crystal display device of claim 1, further comprising:
    a thin film transistor on the first substrate, wherein the thin film transistor comprises a semiconductor layer, a gate electrode, a source electrode and a drain electrode;
    a pixel electrode electrically connected to the thin film transistor; and
    red, green, and blue color filters on the first substrate.

6. The liquid crystal display device of claim 5, wherein the first electrode comprises a material the same as a material of the gate electrode.

7. The liquid crystal display device of claim 6, wherein the first electrode and the gate electrode are defined by a same patterned layer.

8. The liquid crystal display device of claim 5, wherein the first electrode surrounds the display area.

9. The liquid crystal display device of claim 5, wherein the step difference pattern comprises a material the same as a material of at least one of the red, green and blue color filters.

10. The liquid crystal display device of claim 9, wherein the step difference pattern comprises a material the same as a material of the blue color filter.

11. The liquid crystal display device of claim 5, wherein the second electrode comprises a material the same as a material of the pixel electrode.

12. The liquid crystal display device of claim 11, wherein the second electrode and the pixel electrode are defined by a same patterned layer.

13. The liquid crystal display device of claim 5, further comprising:
    a column spacer which maintains an interval between the first substrate and the second substrate.

14. The liquid crystal display device of claim 13, wherein the first light shielding unit, the second light shielding unit and the column spacer comprise a same material, which shields light, as each other.

15. The liquid crystal display device of claim 14, wherein the first light shielding unit, the second light shielding unit and the column spacer are defined by a same patterned layer.

16. The liquid crystal display device of claim 13, wherein the conductive spacer comprises a material the same as a material of the column spacer.

17. The liquid crystal display device of claim 16, wherein the conductive spacer and the column spacer are defined by a same patterned layer.

* * * * *